Aug. 17, 1943.  A. EDDY  2,326,768
PICK-COUNTING DEVICE
Filed Aug. 22, 1941.  2 Sheets-Sheet 1

INVENTOR:
Arnold Eddy
BY Michael S. Striz
his agent

Aug. 17, 1943.  A. EDDY  2,326,768
PICK-COUNTING DEVICE
Filed Aug. 22, 1941  2 Sheets—Sheet 2
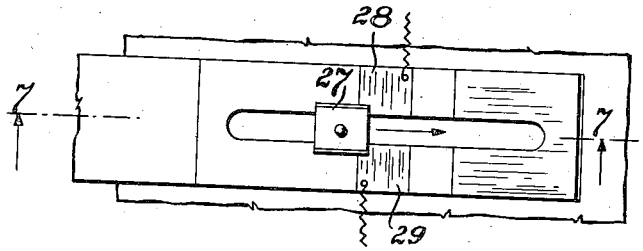
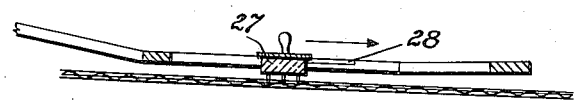
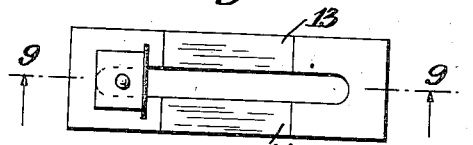
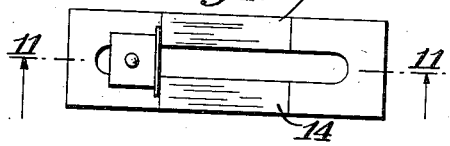
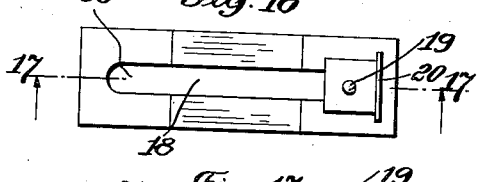
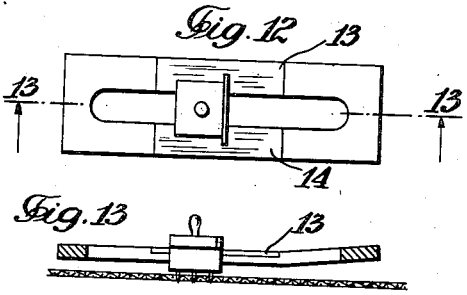
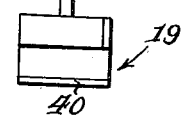
INVENTOR:
Arnold Eddy Patented Aug. 17, 1943

2,326,768

UNITED STATES PATENT OFFICE 2,326,768

PICK-COUNTING DEVICE

Arnold Eddy, Stamford, Conn., assignor, by direct and mesne assignments, of twenty per cent to E. G. Dentay, Toronto, Ontario, Canada, and fifty per cent to Michael S. Striker, New York, N. Y.

Application August 22, 1941, Serial No. 407,931

19 Claims. (Cl. 139—1)

My present invention relates to devices for counting the number of picks per unit of length in a fabric as the same is being woven on a loom.

My invention has for its object a simple and efficient device for counting the number of picks per unit of length, e. g. per inch, in a fabric, the construction of the device being such that, without any calculation, it can be promptly ascertained from the reading of the instrument whether or not the fabric is being woven according to the requirements as to the number of picks per inch.

Another object of my invention consists in providing a counting device which enables direct reading of the number of picks per unit of length and which instrument can be put into operation easily by hand and automatically stops operation after counting the number of picks in the required way.

Still another object of my present invention consists of a pick-counting device which can be permanently mounted on a loom and put into operation at any time when it is desired to control whether the fabric is being woven according to the requirements.

With the above objects in view, my present invention consists of a pick-counting device which comprises an electrically operated mechanism for counting the number of electrical impulses, a source of current for operating said counting mechanism, and an electric circuit comprising in series this counting mechanism, the source of current and two points of interruption of this circuit; furthermore, means are provided for closing one of these interruptions of the circuit while the woven fabric is moving one unit of length, and other means for closing the other interruption of the circuit each time one filling is woven.

In accordance with one preferred embodiment of my present invention, I provide in the electric circuit described above two pairs of contact members forming the points of interruption; in this case, the means for closing the interruptions are making contact between the members of the respective contact member pairs.

I have found it advisable and advantageous that the means for making contact between the members of the first contact member pair, i. e. the means for closing one interruption of the circuit while the woven fabric is moving one unit of length, should be operated by the movement of the fabric woven on the loom; on the other hand, the means for making contact between the members of the second contact member pair, i. e. the means for closing the other interruption of the circuit each time one pick is put into the fabric, should be operated by a part of the loom which makes identical movements during weaving of each filling. I wish to stress that the term "operated," as used above, stands also for the case that these means are operated by independent means and their operation is governed only by the movement of the woven fabric and one moving part of the loom, respectively.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Figs. 6 and 7 show still another embodiment of the pick-counter itself;

Figs. 8 to 17 are showing different positions of the pick-counting device shown in Figs. 2 and 3; and Figure 18 is a side view of a modified contact piece provided with an adhesive face.

Figure 1:
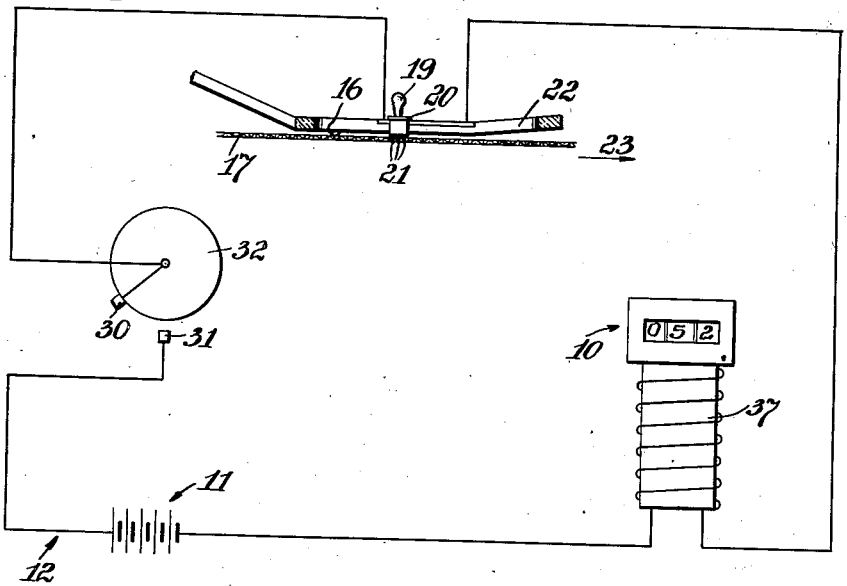
Fig. 1 shows the electrical circuit for my new pick-counting device.

As shown in Fig. 1, my new pick-counting device comprises an electrically operated mechanism 10 for counting the number of electrical impulses, a source of current 11 for operating the mechanism 10, and an electrical circuit 12 including in series this mechanism 10, the source of current 11, and two pairs of contact members.

Figure 2:
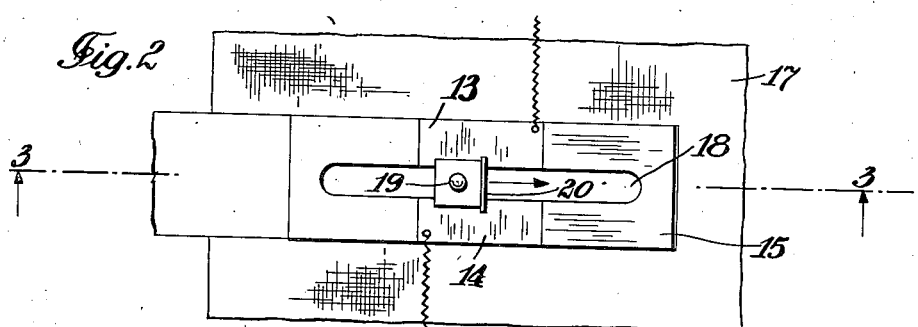
Fig. 2 is a top view of a pick-counter according to my invention.
Figure 3:
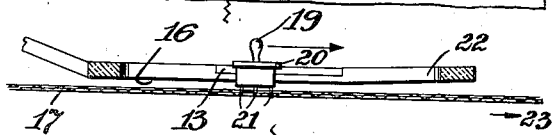
Fig. 3 is a cross-section of the device shown in Fig. 2, along line 3—3 of Fig. 2.

The first pair of contact members consists, as shown in Figs. 2 and 3, of two metallic contacts 13 and 14, embedded in and carried by the insulating supporting plate 15. This supporting plate 15 with the contact members 13 and 14 is mounted on the loom in such a way that its lower face 16 is substantially parallel to the fabric 17 woven on the loom. The means for mounting the pick counter plate 15 to the loom is not shown since it is obvious for everybody skilled in this art how to secure this plate to the loom in the above described manner.

The supporting plate 15 is provided with a longitudinal slot 18 in which the movable contact member 19 is sliding. In the embodiment shown in Figs. 2 and 3, this contact member is made of insulating material and is provided with a contact plate 20 adapted to make contact between the contact members 13 and 14. The contact member 19 is also provided with small pins 21 adapted to engage the woven fabric 17 when pressed against the same.

Furthermore, the supporting plate 15 is bent at its one end, as indicated by numeral 22, away from the woven fabric 17, so that the pins 21 of the contact member 19 are too far away from the fabric to engage the same when the contact member 19 is moving into that part of slot 18 which corresponds to the bent-up end portion 22 of the supporting plate 15.

In the embodiment shown in Figs. 2 and 3, the length of the contact members 13 and 14 in direction of arrow 23, i. e. in direction of the movement of the fabric, is equal to the unit of length in which the number of picks has to be counted. Thus, when the movable contact 19 engages fabric 17 and moves together with the same, the contact plate 20 glides with its two ends along the contact members 13 and 14 and makes contact between the same. As contact plate 20 is of no appreciable thickness and since the length of the contact member 13 and 14 is equal to the unit of length, e. g. one inch, contact is made between the contact members 13 and 14 while the woven fabric is moving one unit of length, i. e. one inch.

Figure 4:
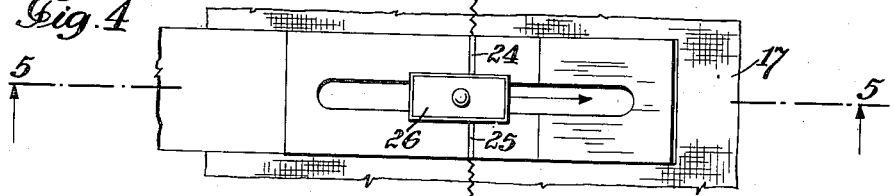
Fig. 4 is a top view of another embodiment of my pick-counter.
Figure 5:
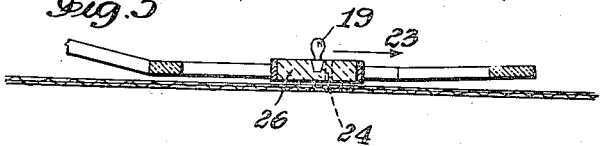
Fig. 5 is a cross-section of the pick-counter shown in Fig. 4 along line 5—5.

In the embodiment shown in Figs. 4 and 5, the contact members 24 and 25 are of no appreciable thickness, while the movable contact piece 26 is made of conductive material and is one inch long. It is self-evident that also in this case contact between the contact members 24 and 25 is made while the woven fabric is moving one inch.

In the embodiment shown in Figs. 6 and 7, the length of the contact-making portion of the movable contact piece 27 is equal to one-half of the length of the unit of length, e. g. is equal to one-half of an inch; in this case the length of the contact members 28 and 29 must be one-half of an inch, too.

In general, the length of the contact-making portion of the movable contact piece 27 added to the length of the contact members in direction of the movement of the woven fabric must be equal to the unit of length; only in this case is the contact piece able to make contact between the contact members as long as the woven fabric is moving one unit of length.

The second pair of contacts, 30 and 31, serves for closing the second interruption of the circuit 12 each time one pick is put into the fabric, i. e. each time one filling is woven. For this purpose, the contact member 30 is secured to a shaft 32 which revolves once during each weaving of a filling; thus, between the contact members 30 and 31 contact is made each time shaft 32 rotates once, i. e. each time one filling is woven.

It must be noted that contact member 30 may also be secured to another movable part of the loom. It is only of importance for this movable part of the loom to carry out during weaving of each filling the same identical movement, which may be a rotating, reciprocating, or other one.

The operation of my new pick-counting device is the following:

When the movable contact piece 19 is in the raised position, shown in Figs. 16 and 17, i. e. when it is supported by the bent-up portion 22 of supporting plate 15, it is not in contact with the fabric 17 moving in direction of arrow 23.

In order to start operation, the contact piece 19 is somewhat raised in direction of arrow 33 and is moved in direction of arrow 34 until it reaches the other end 35 of slot 18. In this position it is pressed downward against direction of arrow 33, engaging thereby with pins 21 the moving fabric 17. After conclusion of the transfer of the contact piece 19, the same is in the position shown in Figs. 8 and 9, ready for starting the counting operation.

After engaging fabric 17 with the pins 21, the contact piece starts to move together with fabric 17 in direction of arrow 23. As long as the contact plate 20 makes no contact between the contact pieces 13 and 14, no indication will appear on the counting mechanism 10. At the moment contact plate 20 reaches contact members 13 and 14, as shown in Figs. 10 and 11, contact is made between these contact members and the first interruption of circuit 12 closed. This interruption stays closed while the contact piece glides along the contact members 13 and 14, as shown in Figs. 12 and 13. At the moment the contact plate 20 reaches the end of the contact members 13 and 14, as it is shown in Figs. 14 and 15, the contact between these contact members is broken and the circuit interrupted again.

Thus the contact piece 19, gliding along the contact pieces 13 and 14, closes the first interruption of circuit 12, while the fabric 17 moves one unit of length. During this interval of time, shaft 32 revolves once while one filling is woven, making thereby each time contact between the contact members 30 and 31; thus the second interruption of circuit 12 is also closed each time one filling is woven, i. e. one pick is put into the fabric.

In this way, the first interruption of circuit 12 is closed while the woven fabric is moving one unit of length and during this period of time the second interruption is also closed each time one filling is woven. This results in closing of circuit 12 as many times as fillings are woven during the period of time which the woven fabric needs for moving one unit of length. Thus the number of electrical impulses caused by closing of the electric circuit 12 is during each operation of the pick-counter identical with the number of picks per unit of length.

These electrical impulses are transformed by means of the electromagnet 37 into mechanical impulses, operating the counting mechanism 10. Therefore, at the termination of each operation of my new device, this counting mechanism indicates the number of picks per unit of length.

In order to disengage pins 21 from the woven fabric 17 after termination of the counting operation, the end portion 22 of supporting plate 15 is bent as above described. After termination of the counting operation, as shown in Figs. 14 and 15, the contact piece 19 moves in the slot portion provided in the bent-up portion 22 of the supporting plate 15; thereby the pins 21 are successively disengaged from fabric 17, thus reaching the initial position shown in Figs. 16 and 17. The counting mechanism is then ready for the next counting operation.

I wish to stress that instead of using pins for connecting the contact piece to the fabric, other means may be used, too. Thus, for instance, I may provide as shown in Figure 18, the contact piece 19 on its face facing the woven fabric with adhesive material 40, e. g., a piece of adhesive tape or the like, holding the contact piece in contact with the fabric when pressed against the same. In the same way, also other connecting means may be used.

It will be understood that each of the elements described above, or two or more together, may also find a useful application in other types of pick-counting devices differing from the types described above.

While I have illustrated and described the invention as embodied in pick-counters for looms, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore such adaptations should and are intended to be comprehended within the meaning and range of equivalency of the following claims.

What I claim as new and desire to secure by Letters Patent is:

1. For use in a loom including a loom part which performs an identical movement during weaving of each successive filling pick, a device for counting the number of picks in a predetermined length of fabric as the same is being woven on said loom, said device comprising an electrically operated mechanism for counting a number of electrical impulses, a source of current for operating said counting mechanism, two separate circuit closing means, an electric circuit comprising in series said counting mechanism, said source of current and said circuit closing means, means constructed to actuate one of said circuit closing means only while the fabric is moving during weaving on said loom a distance being equal to the predetermined length of fabric in which the number of picks has to be counted, and means operated by said loom part, said latter means constructed to actuate the other of said circuit closing means each time one filling pick is woven, thus counting the number of picks in said predetermined length of fabric.

2. For use in a loom comprising a loom part performing identical movements during weaving of each filling pick, a pick counting device for counting the number of picks in a predetermined length of fabric during weaving of the same on said loom, said pick counting device comprising an electrically operated mechanism for counting a number of electrical impulses, a source of current for operating said counting mechanism, two separate circuit closing means, an electric circuit comprising in series said counting mechanism, said source of current, and said circuit closing means, each of said circuit closing means consisting of a movable and a stationary circuit closer, one of said movable circuit closers constructed so as to be in circuit closing contact with one of said stationary circuit closers only during weaving of said predetermined length of fabric, and the other of said movable circuit closers being secured to said loom part and constructed so as to be in circuit closing contact with the other of said stationary circuit closers each time one filling pick is woven, said pick counting device thus counting the number of picks in said predetermined length of fabric.

3. For use in a loom comprising a loom part performing identical movements during weaving of each filling pick, a pick counting device for counting the number of picks in a predetermined length of fabric during weaving of the same on said loom, said pick counting device comprising an electrically operated mechanism for counting a number of electrical impulses, a source of current for operating said counting mechanism, two separate circuit closing means, an electric circuit comprising in series said counting mechanism, said source of current and said circuit closing means, the first of said circuit closing means comprising a first stationary electric contact member pair, and movable means constructed in such a manner as to make circuit closing contact between the members of said stationary contact member pair only during weaving of said predetermined length of fabric, and the second of said circuit closing means comprising a second electric contact member pair, one of said latter contact members being stationary and the other being secured to said loom part and constructed in such a manner as to be in circuit closing contact with the stationary member of said second electric contact member pair each time one filling pick is woven, said pick counting device thus counting the number of picks in said predetermined length of fabric.

4. For use in a loom comprising a loom shaft performing identical movements during weaving of each filling pick, a pick counting device for counting the number of picks in a predetermined length of fabric during weaving of the same on said loom, said pick counting device comprising an electrically operated mechanism for counting a number of electrical impulses, a source of current for operating said counting mechanism, two separate circuit closing means, an electric circuit comprising in series said counting mechanism, said source of current, and said circuit closing means, each of said circuit closing means consisting of a movable and a stationary circuit closer, one of said movable circuit closers constructed in such a manner as to be in circuit closing contact with one of said stationary circuit closers only during weaving of said predetermined length of fabric, and the other of said movable circuit closers being secured to said loom shaft and constructed in such a manner as to be in circuit closing contact with the other of said stationary circuit closers each time one filling pick is woven, said pick counting device thus counting the number of picks in said predetermined length of fabric.

5. For use in a loom including a loom part which performs an identical movement during weaving of each successive filling pick, a device for counting the number of picks in a predetermined length of fabric as the same is being woven on said loom, said device comprising an electrically operated mechanism for counting a number of electrical impulses, a source of current for operating said counting mechanism, two separate circuit closing means, an electric circuit comprising in series said counting mechanism, said source of current, and said circuit closing means, means operated by the moving fabric during weaving of the same on said loom, said means constructed to actuate one of said circuit closing means only while said fabric moves a distance being equal to said predetermined length of fabric in which the number of picks has to be counted, and means operated by said loom part constructed to actuate the other of said circuit closing means each time one filling pick is woven, said counting device thus counting the number of picks in said predetermined length of fabric.

6. For use in a loom having a stationary loom body, and a loom part performing an identical movement during weaving of each successive filling pick, a pick counting device for counting the number of picks in a predetermined length of fabric during weaving of the same on said loom, said pick counting device comprising an electrically operated mechanism for counting a number of electrical impulses, a source of current for operating said counting mechanism, two separate circuit closing means, an electric circuit comprising in series said counting mechanism, said source of current, and said circuit closing means, each of said circuit closing means consisting of a movable and a stationary circuit closer, said stationary circuit closers being arranged to be secured to said stationary loom body, one of said movable circuit closers constructed and secured to said moving fabric during weaving of the same on said loom in such a manner as to be in circuit closing contact with one of the stationary circuit closers only while said fabric moves a distance equal to that length of fabric in which the number of picks has to be counted, and the other of said movable circuit closers being secured to said loom part and constructed in such a manner as to be in circuit closing contact with the other of said stationary circuit closers a predetermined equal number of times each time one filling pick is woven, said pick counting device thus counting the number of picks in said predetermined length of fabric during weaving of the same on said loom.

7. For use in a loom having a stationary loom body, and a loom shaft performing an identical movement during weaving of each successive filling pick, a pick counting device for counting the number of picks in a predetermined length of fabric during weaving of the same on said loom, said pick counting device comprising an electrically operated mechanism for counting a number of electrical impulses, a source of current for operating said counting mechanism, two separate circuit closing means, an electric circuit comprising in series said counting mechanism, said source of current, and said circuit closing means, each of said circuit closing means consisting of a movable and a stationary circuit closer, said stationary circuit closers being arranged to be secured to said stationary loom body, one of said movable circuit closers secured to said moving fabric during weaving of the same on said loom and constructed in such a manner as to be in circuit closing contact with one of said stationary circuit closers only while said fabric moves a distance equal to that length of fabric in which the number of picks has to be counted, and the other of said movable circuit closers being secured to said loom shaft and constructed in such a manner as to be in circuit closing contact with the other of said stationary circuit closers a predetermined equal number of times each time one filling pick is woven.

8. For use in a loom having a stationary loom body, and a loom part performing an identical movement during weaving of each successive filling pick, a pick counting device for counting the number of picks in a predetermined length of fabric during weaving of the same on said loom, said pick counting device comprising an electrically operated mechanism for counting a number of electrical impulses, a source of current for operating said counting mechanism, two separate circuit closing means, an electric circuit comprising in series said counting mechanism, said source of current and said circuit closing means, the first of said circuit closing means comprising a first stationary electric contact member pair arranged to be secured to said loom body and movable contact means secured to the woven fabric during weaving of the same on said loom and constructed in such a manner as to make circuit closing contact between the members of said stationary contact member pair only while said fabric moves a distance equal to said length of fabric in which the number of picks has to be counted, and the second of said circuit closing means comprising a second electric contact member pair, one of said latter contact members being arranged to be secured to said stationary loom body and the other being secured to said loom part and constructed in such a manner as to be in circuit closing contact with each other a predetermined equal number of times each time one filling pick is woven.

9. In a device of the type claimed in claim 8, said means for making contact between the members of the first contact member pair consisting of a separate metallic contact piece being movable in direction normal to the face of the woven fabric and being provided on its face, facing the woven fabric, with small pins, thus being adapted to be pressed against this fabric and to be attached thereby to the same.

10. In a device of the type claimed in claim 8, said means for making contact between the members of the first contact member pair consisting of a separate metallic contact piece being movable in direction normal to the face of the woven fabric and being provided on its face, facing the woven fabric, with small pins, thus being adapted to be pressed against this fabric and to be attached thereby to the same, and means for automatically disconnecting said metallic contact piece from said woven fabric after said contact piece has traveled with the fabric at least one unit length, making contact between said contact members.

11. In a device of the type claimed in claim 8, said means for making contact between the members of the first contact member pair consisting of a separate metallic contact piece being movable in direction normal to the face of the woven fabric and being provided on its face, facing the woven fabric, with small pins, thus being adapted to be pressed by hand against this fabric and to be attached thereby to the same, and supporting means for said metallic contact piece, said supporting means being shaped in such a manner as to move said contact piece away from the woven fabric and thus to disconnect the same from this fabric after it has traveled with the fabric at least one unit length, making contact between said contact members.

12. In a device of the type claimed in claim 8, said means for making contact between the members of the first contact member pair consisting of a separate metallic contact piece, and means to hold this piece in contact with the woven fabric when pressed against the same.

13. In a device of the type claimed in claim 8, said means for making contact between the members of the first contact member pair consisting of a separate metallic contact piece provided on its face, facing the woven fabric, with means adapted to attach said contact piece to the woven fabric when required.

14. In a device of the type claimed in claim 8, said means for making contact between the members of the first contact member pair consisting of a separate metallic contact piece provided on its face, facing the woven fabric, with adhesive material, thus said metallic contact piece being adapted to be attached by said adhesive material to the woven fabric when pressed against the same.

15. In a device of the type claimed in claim 8, each of the members of said first contact member pair arranged to be secured to said stationary loom body being provided with a contact surface near the surface of the moving fabric, said contact surfaces extending less than one unit of length in direction of the movement of said woven fabric substantially parallel to each other, and said means for making contact between these contact surfaces consisting of a separate metallic contact piece attached to the moving fabric, said metallic contact piece having contact surfaces extending in direction of the movement of said fabric a distance being equal to the difference between one unit of length and the length of the contact surfaces of said contact members in direction of the movement of said woven fabric, said contact surfaces of said metallic contact piece contacting during movement of the fabric simultaneously the corresponding contact surfaces of said stationary contact members, thus making contact between said stationary contact members, keeping this contact closed while the fabric is moving one unit of length and breaking this contact after the woven fabric has moved this unit of length.

16. In a device of the type claimed in claim 8, the stationary members of said first stationary electric contact member pair being arranged to be secured to said stationary loom body near the surface of the moving woven fabric and said movable contact means for making contact between these members being constructed to be connected to said moving fabric in such a manner as to move with the same and to make contact between said stationary contact members only while moving with said fabric one unit of length, and to break the contact between these members automatically thereafter, thus closing the circuit between these stationary contact members during weaving of one unit length of fabric on said loom.

17. In a device of the type claimed in claim 8, the stationary members of said first stationary electric contact member pair being arranged to be secured to said stationary loom body near the surface of the moving woven fabric and said movable contact means for making contact between these members consisting of a separate metallic contact piece constructed to be attached to said moving fabric in such a manner as to move with the same and to make contact between said stationary contact members only while moving with said fabric one unit of length, and to break the contact between these members automatically thereafter, thus closing the circuit between these stationary contact members during weaving of one unit length of fabric on said loom.

18. In a device of the type claimed in claim 8, each of the members of said first stationary electric contact member pair being arranged to be secured to said stationary loom body and provided with a contact surface near the surface of the moving fabric, said contact surfaces extending one unit of length in direction of the movement of said woven fabric substantially parallel to each other, and said movable contact means for making contact between the contact surfaces of these members consisting of a separate metallic contact piece constructed to be attached to said moving fabric in such a manner as to move with the same, to contact simultaneously both contact surfaces of said contact members, and to break this contact after having moved with the fabric one unit of length, thus closing the circuit between said contact members during weaving of one unit length of fabric on said loom.

19. In a device of the type claimed in claim 8, each of the members of said first stationary electric contact member pair being arranged to be secured to said stationary loom body and provided with a contact face near the surface of the moving fabric, said contact faces extending one unit of length in direction of the movement of said woven fabric substantially parallel to each other, and said movable contact means for making contact between the contact faces of these members consisting of a separate metallic contact piece attached to the moving fabric, said metallic contact piece having contact faces being very narrow in direction of the movement of said fabric, said contact faces arranged in such a manner as to contact simultaneously the corresponding contact faces of said stationary contact members, thus making contact between the contact faces of said contact members, keeping this contact closed while the woven fabric is moving one unit of length, and breaking this contact at the end of this period of time.

ARNOLD EDDY.